United States Patent
Samuel et al.

(10) Patent No.: US 8,076,653 B2
(45) Date of Patent: Dec. 13, 2011

(54) DISPERSIONS OF LUMINESCENT RARE-EARTH OXIDE PARTICLES, VARNISH COMPRISING THESE PARTICLES, THEIR METHODS OF PREPARATION AND METHOD FOR MARKING SUBSTRATES

(75) Inventors: Jorice Samuel, Annecy (FR); Olivier Poncelet, Grenoble (FR); Olivier Raccurt, Chelieu (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/489,761

(22) Filed: Jun. 23, 2009

(65) Prior Publication Data
US 2009/0321660 A1 Dec. 31, 2009

(30) Foreign Application Priority Data
Jun. 25, 2008 (FR) .................... 08 54243

(51) Int. Cl.
*G01N 21/64* (2006.01)
(52) U.S. Cl. .................... 250/459.1
(58) Field of Classification Search .......... 250/459.1, 250/216; 252/301.4 R, 301.36; 283/92
See application file for complete search history.

(56) References Cited

U.S. PATENT DOCUMENTS

| | | | | |
|---|---|---|---|---|
| 4,030,882 A * | 6/1977 | Blackwell | ............ | 8/657 |
| 4,921,280 A | 5/1990 | Jalon | | |
| 7,464,965 B2 * | 12/2008 | Udagawa et al. | ............ | 283/92 |
| 7,468,413 B2 | 12/2008 | Yokota et al. | | |
| 2003/0187077 A1 | 10/2003 | Chane-Ching | | |
| 2004/0171739 A1 * | 9/2004 | Becciii et al. | ............ | 524/556 |
| 2005/0008877 A1 | 1/2005 | Chane-Ching et al. | | |
| 2005/0208543 A1 * | 9/2005 | Vann et al. | ............ | 435/6 |
| 2006/0249951 A1 * | 11/2006 | Cruikshank et al. | ............ | 283/92 |
| 2007/0213413 A1 | 9/2007 | Chane-Ching et al. | | |
| 2008/0176968 A1 * | 7/2008 | VanSumeren et al. | ............ | 521/97 |
| 2008/0185557 A1 | 8/2008 | Agrawal et al. | | |
| 2009/0215614 A1 | 8/2009 | Chane-Ching | | |

FOREIGN PATENT DOCUMENTS

| | | |
|---|---|---|
| CN | 1378083 A | 11/2002 |
| EP | 0 169 750 A1 | 1/1986 |
| EP | 1 884 554 A1 | 2/2008 |
| GB | 1 018 005 | 1/1966 |
| WO | WO 01/94262 A1 | 12/2001 |
| WO | WO 03/022743 A1 | 3/2003 |
| WO | WO 03/039724 A1 | 5/2003 |
| WO | WO 03/039725 A1 | 5/2003 |
| WO | WO 2005/051846 A2 | 6/2005 |
| WO | WO 2005/074631 A2 | 8/2005 |
| WO | WO 2005/113705 A1 | 12/2005 |
| WO | WO 2006/069028 A2 | 6/2006 |
| WO | WO 2006/111650 A1 | 10/2006 |
| WO | WO 2007/085650 A1 | 8/2007 |

* cited by examiner

*Primary Examiner* — Kiho Kim
(74) *Attorney, Agent, or Firm* — Oblon, Spivak, McClelland, Maier & Neustadt, L.L.P.

(57) ABSTRACT

A composition including: a dispersion of particles of at least one oxide of at least one luminescent rare earth, disaggregated and stabilized in a hydrophobic liquid medium to which at least one surfactant is added, in which said surfactant is a non-ionic surfactant having an HLB (hydrophilic-to-lipophilic balance) lower than 12.

27 Claims, 1 Drawing Sheet

DISPERSIONS OF LUMINESCENT RARE-EARTH OXIDE PARTICLES, VARNISH COMPRISING THESE PARTICLES, THEIR METHODS OF PREPARATION AND METHOD FOR MARKING SUBSTRATES

TECHNICAL FIELD

The invention relates to dispersions of luminescent rare-earth oxide particles.

More precisely, the invention relates to dispersions of disaggregated and stabilized rare-earth oxide particles in a hydrophobic liquid medium.

The invention further relates to varnishes comprising said particles.

The invention also relates to the methods for preparing these dispersions and varnishes.

The invention lastly relates to a method for marking substrates using the said varnishes, to the substrates provided with the markings thereby obtained, and to a method for identifying objects using these varnishes and markings.

PRIOR ART

The technical field of the invention can be defined in general as that of the marking of objects, products and articles by luminescent compounds, in particular for purposes of traceability and prevention of counterfeiting.

Methods already exist for identifying manufactured articles, and particularly textile articles, in order to prevent the counterfeiting of these articles.

These methods in particular use visual marks, such as holograms, or magnetic marks.

This type of mark can only be applied before the article is used, is unconcerned with the article as such, and is generally joined to its labels and/or its packaging. This type of mark therefore cannot be applied when the article is already in use, stripped of its labels and/or its packaging.

This is why it has been proposed to use luminescent compounds, for example in the form of particles, for marking articles. These compounds provide a uniform marking, in the body, bulk, of the article and even when it is in use. The mark is an integral part of the article and is not removed when it is unpacked or the label is removed.

The mark is also invisible to the naked eye, and is only revealed by a specific and predefined luminous excitation such as UV or laser excitation, etc.

Thus document EP-A-0169750 [1] relates to the preparation of fibres, security threads, luminescent textile materials in which luminescent rare-earth chelates are introduced into these materials subsequent to their fabrication, by a dyeing method. The dyeing medium is a bath containing a combination of one or more solvents in which the rare-earth chelates are soluble, and one or more diluents in which the rare-earth chelates are insoluble. This method is rather time-consuming, and requires an additional dyeing step at the end of the production line.

Document WO-A2-2005/051846 [2] describes a method for preparing a single-phase or multiphase powder, optionally in the form of a colloidal suspension, of rare-earth sesquioxide, oxyhydroxide, hydroxide, or a mixed rare-earth oxide, in which rare-earth precursors, which are mostly rare-earth nitrates, are dissolved in a polar organic solvent selected from alcohols, preferably polyols, glycines and oils in the presence of the quantity of water at least necessary for the formation of the said sesquioxide, oxyhydroxide, hydroxide or mixed oxide; the solution thus obtained is heated for a sufficient time to obtain the precipitation of a sesquioxide, oxyhydroxide, hydroxide or mixed oxide powder, in the form of nanostructured, submicron-sized particles, having an average diameter of 20 to 800 nm; the powder obtained is optionally separated from the polar organic solvent and the powder obtained is optionally redispersed in an appropriate solvent, for example of the alcohol, ether, acetone or water type.

This redispersion can be facilitated by the addition of chemical dispersants or by mechanical or ultrasonic stirring. The dispersion obtained in this document is not a disaggregated and stabilized dispersion. The submicron-sized powders can be used in particular for the fiduciary marking of textiles or plastics.

Document WO-A2-2005/074631 [3] relates to a method for controlling the aggregation of nanoparticles based on rare earths, for example yttrium hydroxyacetate nanoparticles, by chelating these particles with diblock or triblock copolymers to form aggregates. Complexes are formed by mixing a dispersion based on rare earth with a solution of copolymer using a vortex stirrer.

In this document, an attempt is made to aggregate the particles rather than to disaggregate them.

Document WO-A1-2006/111650 [4] describes a colloidal dispersion in a continuous, essentially aqueous, phase of a mixed oxide of cerium and at least one other element selected from zirconium, rare earths other than cerium, titanium and tin.

This dispersion is prepared by forming a liquid medium comprising salts of cerium and at least one other element, by contacting the medium with a base to obtain a pH of at least 9 and thereby a precipitate, separating the precipitate from the medium, washing the precipitate, and peptizing the precipitate by treatment with an acid.

This document does not describe the preparation of colloidal dispersions of rare earth oxides in a hydrophobic medium.

Document WO-A1-03/022743 [5] relates to an aqueous colloidal dispersion of particles of a vanadate or phosphovanadate of at least one luminescent rare earth, comprising a complexing agent or an anion of a monovalent acid soluble in water.

This dispersion is prepared by contacting either a starting colloidal dispersion or a starting dispersion of complexes of which the pH is at least 7, with vanadate ions and optionally phosphate ions, and the pH of the medium is adjusted to at least 9.

This document does not describe the preparation of colloidal dispersions of rare earth oxides in a hydrophobic medium.

Document WO-A1-01/94262 [6] relates to a colloidal dispersion of a cerium compound such as an oxide or a hydrated oxide, or of a compound of cerium with at least one other element selected from titanium, vanadium, chromium, manganese, iron, cobalt, nickel, copper, zinc, aluminium, gallium, zirconium, and rare earths other than cerium. This dispersion comprises an amino acid which binds to the colloidal particles by chemical complexation, electrostatic bonding or adsorption, thereby improving the colloidal stability of the dispersion.

This dispersion is prepared simply by adding an amino acid to a colloidal dispersion of a cerium compound or of a compound of cerium with another element. This addition can be carried out with stirring.

The solvent of the dispersion may be selected from alcohols, glycols, glycol ethers, polyols, and ketones. However, in the examples, only aqueous dispersions are prepared.

Document GB-A-1018005 [7] describes luminescent compounds which are mixed oxides of rare earths or salts thereof. These compounds can be incorporated in a solution or dispersion of a binder such as a material transparent to the radiation emitted by the luminescent compound. The composition thereby obtained can be applied to a surface, and after evaporation of the solvent, yield a luminescent coating.

For example, a mixed europium yttrium oxide is added to a 20% solution of polymethyl methacrylate in methyl ethyl ketone, and the solution is vigorously stirred to produce a uniform suspension which is then applied to a glass plate and dried to yield a coating fluorescent in the red under UV excitation.

No information is provided in this document to indicate that a stabilization of the particles over time is obtained.

Document WO-A2-2006/069028 [8] relates to formulations having persistent high-intensity photoluminescence or phosphorescence, which comprise a photoluminescent phosphorescent compound such as a europium-activated metal oxide aluminate, a liquid medium, a polymer resin and at least one stabilizer such as a dispersant to prevent the particles from aggregating, which causes the light intensity and persistence to deteriorate, and optionally a wetting agent.

It appears that in this document, dispersions of disaggregated and stabilized luminescent rare-earth oxide nanoparticles in a hydrophobic medium have not been prepared.

The use of surfactants for the dispersion or adsorption at the surface of mineral particles, particularly of oxide particles, is described in documents WO-A1-2003/039725 [9] and WO-A1-2003/039724 [10].

Document [9] describes emulsifying compositions comprising mineral nanoparticles having a surface modified with organic chains which are prepared by forming a hydrophobic phase and a colloidal aqueous dispersion of nanometer-sized particles based on a rare earth phosphate or vanadate, the aqueous dispersion or the hydrophobic phase comprising a molecular surfactant suitable for combining with the colloidal particles; then by mixing the hydrophobic phase and the aqueous dispersion and by subjecting the mixture to an emulsification optionally followed by a centrifugation.

In this document, an attempt is essentially made to form two-phase emulsions and not stabilized dispersions in a hydrophobic solvent.

Document [10] relates to multiple emulsions, for example of the water-in-oil-in-water type, comprising, as stabilizing species at the water-oil interface, solid particles having nanometer-sized dimensions, at the surface of which hydrophobic organic chains are bonded.

As in document [9] an attempt is essentially made in this document to form multiple emulsions and not dispersions stabilized in an exclusively hydrophobic solvent.

Document CN-A-2001/109551 [11], according to the abstract, describes a method in which nanoparticles of rare earths, for example europium-doped gadolinium oxide or yttrium oxide nanoparticles, having a size of 3 to 400 nm, are dispersed in an organic solvent containing a surfactant, a functional monomer, a functional reactant and a coupling agent are added thereto, and a suspension polymerization is carried out in the presence of an initiator, whereby the nanoparticles are covered with a polymeric coating.

It is not stated whether the nanoparticles in the dispersion are disaggregated and stabilized.

It therefore appears in view of the above that the dispersion of particles, and particularly nanoparticles, of luminescent rare earth oxides in essentially polar, hydrophilic media, is known, but that the problem of the disaggregation and stabilization of these nanoparticles in a hydrophobic solvent or medium has not been solved.

A still unsatisfied need exists for dispersions of disaggregated and stabilized luminescent rare-earth oxide particles in a hydrophobic medium such as methyl ethyl ketone.

The preparation of such dispersions would serve to easily incorporate the luminescent rare-earth oxide particles in polymers for the purposes of marking, because many polymers are in fact soluble in hydrophobic solvents.

The term stabilized particles generally means that the dispersion of rare-earth oxide particles in solution is sufficient to make them suitable for subsequent use for marking purposes.

Similarly, a need exists for a method for preparing such dispersions of disaggregated, stabilized rare-earth oxide particles.

SUMMARY OF THE INVENTION

It is one goal of the present invention, among others, to meet these needs.

It is a further goal of the present invention to provide dispersions of disaggregated and stabilized rare-earth oxide particles, in a hydrophobic medium or solvent, and a method for preparing these dispersions of particles which do not have the drawbacks, limitations, defects and disadvantages of the dispersions and their preparation methods of the prior art.

This goal, and others, are achieved according to the invention by a dispersion of particles of at least one oxide of at least one luminescent rare earth, which particles are disaggregated (disagglomerated) and stabilized in a hydrophobic liquid medium to which at least one surfactant is added (containing at least one surfactant), in which the said surfactant is a non-ionic surfactant having an HLB (hydrophilic-to-lipophilic balance) lower than 12.

Advantageously, the non-ionic surfactant has an HLB lower than 11, for example between 4 and 10.

Advantageously, the non-ionic surfactant comprises at least one carbon chain of 5 to 40 carbon atoms.

A dispersion of nanoparticles of at least one oxide of at least one rare earth, in which the nanoparticles are disaggregated (disagglomerated) and stabilized in a hydrophobic liquid medium, the said hydrophobic medium further comprising a specific surfactant, which is a non-ionic surfactant, optionally comprising at least one carbon chain with 5 to 40 carbon atoms, and having an HLB lower than 12, has never been described in the prior art, as represented in particular by the documents listed above.

The dispersion according to the invention does not have the drawbacks in terms of insufficient stability and aggregation (agglomeration) of the particles of the dispersions in a hydrophobic medium of the prior art, and provides a solution to the problems raised by dispersions of luminescent rare-earth oxide particles in hydrophobic medium of the prior art.

It has been demonstrated according to the invention that, in particular, the use in the dispersions according to the invention of a specific, non-ionic surfactant, which also has a specific HLB, i.e. a low HLB, surprisingly serves to obtain, and for the first time, excellent uniformity (homogeneity) of the dispersion, absence of aggregates, and excellent stability.

It has further been found that the stabilization obtained by the specific surfactant, with a specific HLB, used according to the invention, was superior to (better than) the stabilization obtained with other ionic and non-ionic surfactants which did not satisfy the specific condition of low HLB indicated above.

The experimental results given below in Table 1 present, for similar hydrophobic liquid media, similar particles, and different surfactants, the time (t) after which the fluorescence intensity has decreased by half, which is equivalent to the time after which 50% of the particles have reaggregated (re-agglomerated) and have settled.

TABLE 1

| Surfactant | Type | HLB | t |
|---|---|---|---|
| Igepal ® CO-520 | Non-ionic | HLB 10 | >6000 sec |
| CTAB | Cationic | HLB 10 | 1700 sec |
| Tween ® 80 | Non-ionic | HLB 15 | 1100 sec |
| Triton ® X100 | Non-ionic | HLB 13.5 | A few sec (for example 1 to 10 sec) |
| Without surfactant | | | A few sec (for example 1 to 10 sec) |

These results show that the two conditions of a non-ionic character and low HLB, which are the specific conditions satisfied by the surfactants used according to the invention, ensure far better colloidal stabilization in the solvent considered. Thus the time t for IGEPAL® CO-520 is longer than 6000 sec, which is more than four times longer than a dispersion containing a surfactant with a low HLB but of the cationic type, more than five times greater than a dispersion containing a non-ionic surfactant but having a high HLB above 12, and infinitely greater than another non-ionic surfactant also having a high HLB higher than 12.

It should be observed that IGEPAL® CO-520 also meets the optional condition of carbon chain length mentioned above.

The terms "stabilized" and "disaggregated" ("disagglomerated") particles are well known to a person skilled in the art in this field of the technique.

The term "disaggregated" ("disagglomerated") particles generally means that in the dispersion, at least 60%, preferably at least 70%, and even more preferably at least 90% of the number of particles, for example nanoparticles, are individual particles.

The expression dispersion in which the particles are "stabilized" generally means a dispersion in which, after a period of 1 to a few hours, for example 1 to 10 hours, after the dispersion of the particles in the medium, at least 50% of the particles have not settled and these particles are still disaggregated in a proportion of 50%.

As already indicated above, it is also possible to define the stability of the particles with regard to the use of the dispersion for marking purposes. The term stabilized particles may thus also mean that the dispersion of the rare-earth oxide particles in solution is sufficient to make it suitable for subsequent use for marking purposes.

Generally, the said hydrophobic liquid medium consists of a hydrophobic organic solvent or a mixture of hydrophobic organic solvents.

No limitation exists as to the organic solvent or to the mixture of hydrophobic organic solvents which may constitute the liquid medium.

The hydrophobic organic solvent(s) may be selected in general from all solvents which are substantially insoluble in water.

The solvent or solvents may be selected from ketones such as dialkyl ketones like acetone and methyl ethyl ketone (MEK) and alkyl aryl ketones; esters, such as linear or branched alkyl (for example $C_1$ to $C_6$ alkyl), or cyclic esters, of fatty acids, of acetic acid or benzoic acid; hydrocarbons such as saturated, unsaturated or aromatic hydrocarbons, like alkylbenzenes (for example ($C_1$ to $C_6$)alkylbenzenes), such as toluene and xylene, and alkyl naphthalenes (for example ($C_1$ to $C_6$)alkylnaphtalenes); amides of alkane (for example ($C_1$ to $C_6$)alkane) carboxylic acids; alkyl (for example ($C_1$-$C_6$) alkyl) and alkenyl (for example ($C_1$-$C_6$)alkenyl)pyrrolidones such as vinylpyrrolidone (VP); alkyl (for example ($C_1$-$C_6$) alkyl) caprolactams; halogenated solvents such as chlorinated solvents like chloroform; and mixtures thereof.

The particles of the dispersion generally have an average size between 2 nm and 1 micron.

Advantageously, the particles of the dispersion are nanoparticles which have an average size from 100 to 500 nm, preferably from 100 to 300 nm.

The rare earth may generally be selected from Y, Ce, Pr, Nd, Pm, Sm, Eu, Gd, Tb, Dy, Ho, Er, Tm, Yb, and Lu.

The luminescent rare earth oxide is generally a rare-earth oxide doped with a doping element.

This doping element is generally also a rare earth, but different from the rare earth of the oxide.

Such rare-earth oxides are known and available on the market.

Thus, the oxide may be gadolinium oxide doped with terbium, gadolinium oxide doped with europium, ytterbium oxide doped with europium, or vanadium oxide doped with europium.

In general, the concentration of the oxide particles in the dispersion is from 0.01% to 10% by weight, preferably from 1 to 5% by weight.

No limitation exists as to the surfactant(s) as long as it(they) meet the conditions listed above concerning the HLB in particular.

Advantageously, the non-ionic surfactant may be selected from surfactants composed of alkyl phenol groups, in particular nonyl phenol or octyl phenols, and ethylene oxide groups (having various sizes in particular 1.5, 2 or 5) according to any combination suitable for preserving an HLB lower than 12, and mixtures thereof.

Examples of these surfactants are polyoxyethylene (5) isoctyl phenyl ether, polyoxyethylene (5) nonyl phenyl ether, polyoxyethylene (2) isoctyl phenyl ether, and polyoxyethylene (2) nonyl phenyl ether, available from General Dyestuff Corporation under the respective trade names of IGEPAL® CA-520, IGEPAL® 00-520, IGEPAL® CA-210 and IGEPAL® CO-210, and mixtures thereof.

In general, the surfactant concentration is from 0.001 to 10% by weight, preferably from 0.01 to 5% by weight; even more preferably from 0.05 to 5% by weight; even better from 0.05 to 2% by weight; and still better from 0.1 to 1% by weight of the total weight of the dispersion.

The invention further relates to a method for preparing the dispersion as described above, in which the following steps are carried out in succession:

the particles of at least one oxide of at least one luminescent rare earth are added to the hydrophobic medium to form thereby a dispersion A;

the non-ionic surfactant is added to dispersion A;

dispersion A containing the non-ionic surfactant is subjected to at least one mechanical action.

It has been demonstrated that thanks to the combination, according to the inventive method, of a specific non-ionic surfactant, having a specific HLB, as described above, and a mechanical action, it was possible to perfectly disaggregate oxide aggregates of rare-earth particles in a hydrophobic medium, for example, based on the solvents acetone and/or methyl ethyl ketone.

Thanks to the method according to the invention and to this genuine synergy that occurs between the specific surfactant having a specific HLB and the mechanical action, dispersions are thus obtained in a hydrophobic solvent in which the particles are perfectly disaggregated and stabilized.

None of the prior art methods is suitable for obtaining these excellent properties for dispersions of luminescent rare-earth oxides specifically in hydrophobic organic solvents, and none of the prior art documents mentions or suggests the simultaneous use of a specific surfactant, having a low specific HLB, and a mechanical action to prepare dispersions in a hydrophobic medium.

The mechanical action may be a shear action, an ultrasonic action, a grinding action, or a combination of two or more of these actions.

The invention also relates to a varnish comprising particles of at least one oxide of at least one luminescent rare earth, disaggregated ("disagglomerated") and stabilized as described above, at least one hydrophobic organic solvent, and at least one polymer.

In this varnish, the concentration of the particles is generally from 0.01% to 1% by weight, preferably 0.1% by weight.

Advantageously, the polymer is a film-forming polymer.

The polymer may be selected from all polymers partially or totally soluble in hydrophobic solvents. That is, the polymer may be selected from the following polymers provided as non-limiting examples: polyvinyl chlorides, aminoplasts, polyurethanes, unsaturated polyesters, phenoplasts, polysiloxanes, epoxy resins, allyl resins, vinyl esters, alkyds, polyureas, polyisocyanurates, poly(bismaleimide)s and polybenzimidazoles.

The invention also relates to a method for preparing the varnish as described above, in which a solution of at least one polymer in at least one hydrophobic organic solvent is mixed with the dispersion of particles of at least one oxide of at least one luminescent rare earth as described above, and the mixture is subjected to at least one mechanical action.

Advantageously, the hydrophobic organic solvent or solvents of the solution of at least one polymer is(are) the same as the hydrophobic organic solvent(s) of the dispersion of particles.

The invention also relates to a method for marking a substrate by coating, impregnation of this substrate with a varnish, in which the said varnish is such as defined above.

The invention further relates to a substrate characterized in that it is provided with a mark or marking obtained by drying and/or absorption of the varnish as described above.

The invention further relates to a method for identifying objects, articles, which comprises the following steps in succession:
- markings, marks are prepared, particularly security markings on objects, for example a marking for each object, using the varnish according to the invention as described above, the said markings being invisible to the naked eye and visible only when illuminated by ultraviolet radiation;
- the objects are subjected to excitation by ultraviolet radiation;
- the said markings are read by detecting the luminescence radiation emitted by these markings;
- the said objects are identified according to the said reading.

BRIEF DESCRIPTION OF THE DRAWING

The invention will be better understood from the reading of the detailed description that follows, provided for illustration and non-limiting, in conjunction with the appended drawing in which:

the single FIGURE is the diagram of the size distribution, measured by the light scattering of the nanoparticles of the dispersion of example 1 according to the invention.

Figure 1:
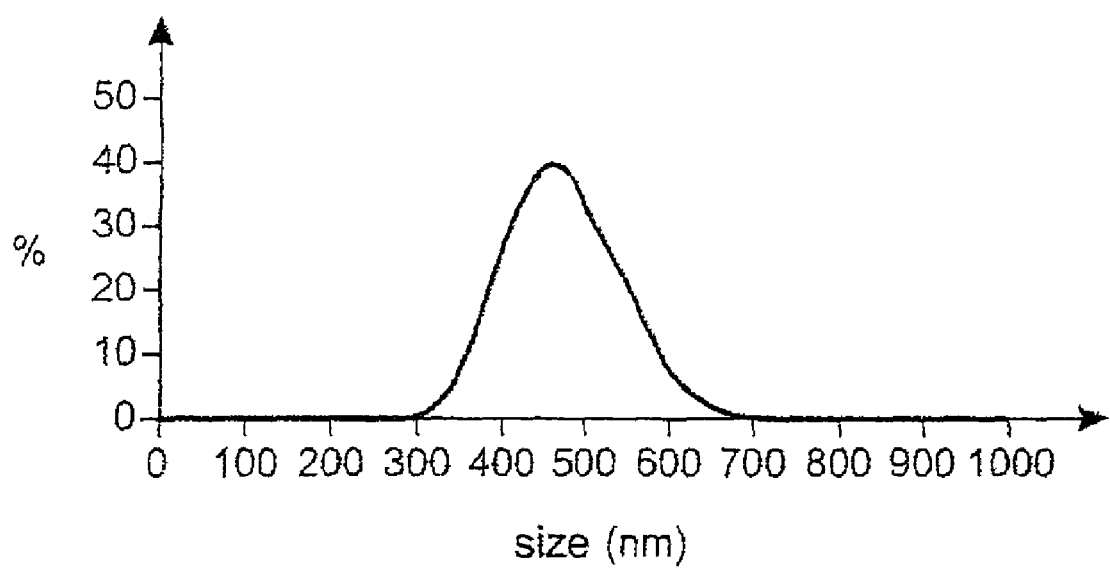

The x-axis shows the size (in nm) and the y-axis the percentage of nanoparticles.

DETAILED SUMMARY OF THE INVENTION

The description that follows is provided essentially in relation to the inventive method for preparing dispersions of luminescent rare-earth oxide particles.

According to the invention, a suspension or dispersion of luminescent rare-earth oxide particles is prepared in a hydrophobic liquid medium.

For this purpose, luminescent rare-earth oxide particles are first added to a hydrophobic liquid medium in order to form a first suspension or dispersion A.

A suspension or dispersion is generally defined as a liquid medium in which solid particles are distributed.

The rare earth-oxide particles according to the invention generally have a size of 2 nm to 1 micron.

The term size generally means the largest dimension of these particles.

In the more general case in which these particles are essentially spherical and have the shape of spheres or spheroids, this size is defined by the diameter of the particles.

The term size generally means the average size, for example the average diameter of the particles.

Advantageously, the particles of the dispersions according to the invention are nanoparticles having an average size of 100 to 500 nm, preferably from 100 to 300 nm.

The term rare earths means yttrium and all the elements also called lanthanides, that is, elements having an atomic number between 57 and 71 inclusive, such as Ce, Pr, Nd, Pm, Sm, Eu, Gd, Tb, Dy, Ho, Er, Tm, Yb, Lu, and Y.

The term luminescence means the emission of an electromagnetic radiation, in particular a radiation located in the visible, under the effect of an excitation, in particular by ultraviolet light.

The term luminescence includes both photoluminescence and phosphorescence, as well as fluorescence.

The luminescent rare earth oxides which constitute the particles of the dispersions according to the invention are generally doped luminescent oxides.

A rare earth oxide is said to be "doped" by a doping element, generally when the said doping element accounts for less than 25% by weight of the total weight of the metal cations.

The rare earth oxide included in the dispersion according to the invention may have the following formula: $Ln_2O_3$ where Ln is Y, Ce, Pr, Nd, Pm, Sm, Eu, Gd, Tb, Dy, Ho, Er, Tm, Yb, or Lu.

The oxide may be doped with a doping element which is preferably also a rare earth Ln, but different from the rare earth of the oxide, in a proportion of 0.1 to 25% by weight, for example in a proportion of 5% by weight, of the weight of the rare earth oxide.

Mention can be made for example of gadolinium oxide doped with terbium (5%) which is fluorescent, or gadolinium oxide doped with europium or ytterbium oxide doped with europium, or even vanadium oxide doped with europium.

The hydrophobic liquid medium of the dispersion according to the invention consists of a hydrophobic organic solvent or a mixture of hydrophobic organic solvents.

This hydrophobic solvent or solvents may be selected from all hydrophobic solvents known to a person skilled in the art. Preferred hydrophobic organic solvents have already been listed above.

Advantageously, the hydrophobic solvent or solvents is(are) selected from acetone, methyl ethyl ketone, chloroform and mixtures thereof.

The concentration of the rare-earth oxide particles in the suspension or dispersion A is generally from 0.01 to 10% by weight, preferably from 1 to 5% by weight.

A specific surfactant is then added to the suspension or dispersion A, and according to the invention, said specific surfactant is a non-ionic surfactant having a low HLB and preferably a long carbon chain.

In the context of the invention, low HLB means an HLB value that is lower than 12, preferably lower than 11 and for example from 4 to 10.

In the context of the invention, long carbon chain surfactant means that the surfactant preferably comprises at least one carbon chain comprising 5 to 40 carbon atoms.

The non-ionic surfactants meeting these conditions relating to the HLB and optionally to the length of the carbon chain can be determined easily by a person skilled in the art.

Among these non-ionic surfactants, mention can be made in particular of surfactants composed of alkyl phenol groups (in particular nonyl phenols or octyl phenols) and ethylene oxide groups (of various sizes: particularly 1.5; 2; or 5), in any combination suitable for preserving an HLB lower than 12, and mixtures thereof. Examples of these surfactants (IG-EPAL®) have already been given above.

The surfactant is generally added to the suspension or dispersion A, in a concentration of 0.001 to 10% by weight, preferably 0.01 to 5% by weight; even more preferably 0.05 to 5% by weight; even better 0.05 to 2% by weight; and even better 0.1 to 1% by weight of the total weight of the dispersion or suspension A.

According to the invention, the suspension or dispersion is then subjected to a mechanical action, to a mechanical treatment.

It is the genuinely synergistic combination of the specific non-ionic surfactant described above and of the mechanical action which serves to disaggregate, deflocculate the particles, to individualize the particles, to homogenize the suspension, dispersion, and thereby to ensure excellent stability of the dispersion, suspension of particles.

This mechanical action may be a shear or grinding action or a combination of a plurality of these actions.

The suspension or dispersion may, for example, be subjected simultaneously to a stirring action and to an ultrasonic action.

It may be carried out in an apparatus such as a homogenizer, and the suspension may simultaneously be subjected to ultrasonic waves by means of an ultrasound horn causing cavitation in the dispersion.

The disaggregated, stabilized suspension obtained can then be mixed with a solution of a polymer in a solvent. Such a solution can be designated by the term of varnish.

As an alternative, the particles can be separated, dried and then redispersed in a solution of a polymer in a solvent, that is a varnish.

The solvent of the polymer solution, in other words, the solvent of this first varnish, is generally selected so that it is miscible with the hydrophobic solvent of the stabilized suspension, and that, on the whole, the first varnish is soluble in the hydrophobic organic solvent of the suspension, dispersion of particles.

Thus, the solvent of the polymer solution, of the first varnish, may be selected from acetone, methyl ethyl ketone, hydrocarbons and mixtures thereof.

Preferably, the solvent or solvents of the polymer solution is(are) the same as that of the hydrophobic medium of the suspension, dispersion of rare-earth oxide particles.

The polymer, as indicated above, is advantageously selected from film-forming polymers.

The polymer may be selected from all polymers which are totally or partially soluble in hydrophobic solvents, that is in particular a polymer selected from, as non-limiting examples: PVCs, aminoplasts, polyurethanes, unsaturated polyesters, phenoplasts, polysiloxanes, epoxy resins, allyl resins, and vinyl ester resins, alkyds, polyureas, polyisocyanurates, poly(bismaleimide)s and polybenzimidazoles, and mixtures thereof.

The redispersion of the particles in the first varnish or the mixing of the suspension, dispersion of particles with the first varnish is carried out so that the particle concentration in the final varnish obtained after mixing, redispersion is generally from 0.01 to 1% by weight of the total weight of the varnish, preferably from 0.1 to 0.5% by weight of the total weight of the varnish.

According to the invention, the mixture of the suspension or dispersion and the polymer solution (first varnish) is then subjected to a mechanical action, a mechanical treatment, similar to that employed to obtain the suspension, dispersion of particles.

Again, the combination of the specific non-ionic surfactant with a specific HLB described above and of the mechanical action serves to disaggregate, deflocculate, the particles, individualize the particles, homogenize the suspension, dispersion and thereby ensure excellent stability of the final varnish obtained, in which the oxide particles are also disaggregated and stabilized.

The final varnish can then be applied, coated, lined on any type of substrate to produce a marking or a mark thereon. This application or coating can be carried out by any coating, lining or application method known to a person skilled in the art.

The said mark or marking essentially comprises the said luminescent rare-earth oxide particles and the polymer of the varnish in which the luminescent rare-earth oxide particles are uniformly distributed, and this varnish is obtained by evaporation and/or absorption in the substrate, of essentially all of the other constituents of the ink such as the solvents.

This substrate may be made from metal, for example, from aluminium, steel; glass; ceramic; a material containing cellulose such as paper, optionally coated or glazed, cardboard or wood; synthetic polymer ("plastic") such as PVCs, PETS, polyolefins, such as polyethylenes (PE), polypropylenes (PP); "Plexiglas"; fabric; "non-woven" fabric; or any other non-porous or porous substance; or composite of a plurality of the preceding materials.

This substrate may be selected in particular from articles of clothing, or fiduciary documents.

Uniform (homogeneous) markings, marks, of excellent quality, are obtained on all substrates. The marking obtained, owing to the stable and non-aggregate character of the dispersion followed by the varnish having served to obtain it, is stable, lasting, and thus can be reliably subjected to inspection operations throughout the lifetime of the marked article or object.

Furthermore, this marking, mark is an integral part of the article or object, does not depend on the packaging thereof or on labels affixed thereto, and may concern new objects, packaged objects as well as objects in use.

The marking or mark may finally have numerous forms, both two-dimensional and three-dimensional, depending on the intended use.

The luminescence can be detected reliably on all types of substrate.

The marking according to the invention and its identification can be implemented for numerous purposes, of which mention can be made in particular of traceability, the mark then providing the indication for example of a batch number, or the prevention of counterfeiting, the mark then being a "anti-counterfeiting" marking establishing the origin of the marked article.

The invention will now be described with reference to the following examples provided for illustration and non-limiting.

Example 1

450 nm fluorescent particles of gadolinium oxide doped with terbium are placed in suspension in methyl ethyl ketone in a concentration of 1% by weight, producing a suspension, solution A having a volume of 50 mL.

A non-ionic surfactant with a low HLB (10) and a long carbon chain, that is polyoxyethylene (5) nonyl phenyl ether, is then added to solution A in a concentration of 0.1% by weight, producing a solution A'.

Solution A' is mechanically stirred using a homogenizer (Ultra Turrax® T10) for 10 minutes at 2000 rpm. According to the invention, in this solution or dispersion, the oxide nanoparticles are "disaggregated" and this is corroborated by the size distribution diagram measured by dynamic light scattering in the single FIGURE.

Solution A' is mixed with a varnish B (soluble in methyl ethyl ketone and containing 50% PVC and 50% PVA) in proportions of 50 mL of solution A' for 450 mL of varnish, thereby to obtain a varnish of which the particle concentration is 0.1% by weight.

The varnish is mechanically stirred using a homogenizer (Ultra Turrax® T10 for 10 minutes at 2000 rpm).

A fabric is coated by brush with the varnish thus prepared.

The invention claimed is:

1. A composition comprising:
   a dispersion of particles of at least one oxide of at least one luminescent rare earth, disaggregated and stabilized in a hydrophobic liquid medium to which at least one surfactant is added, in which said surfactant is a non-ionic surfactant having an HLB (hydrophilic-to-lipophilic balance) lower than 12.

2. The composition according to claim 1, in which said surfactant has an HLB lower than 11.

3. The composition according to either claim 1 or claim 2, in which said surfactant comprises at least one carbon chain of 5 to 40 carbon atoms.

4. The composition according to claim 1, in which said hydrophobic liquid medium consists of a hydrophobic organic solvent or a mixture of hydrophobic organic solvents.

5. The composition according to claim 4, in which the hydrophobic organic solvent or solvents are selected from ketones, esters, hydrocarbons, amides of alkane carboxylic acids, alkyl and alkenyl pyrrolidones, alkyl caprolactams, halogenated solvents, and mixtures thereof.

6. The composition according to claim 1, in which the particles have an average size from 2 nm to 1 micron.

7. The composition according to claim 6, in which the particles are nanoparticles which have an average size from 100 to 500 nm.

8. The composition according to claim 1, in which the rare earth is selected from Y, Ce, Pr, Nd, Pm, Sm, Eu, Gd, Tb, Dy, Ho, Er, Tm, Yb, and Lu.

9. The composition according to claim 1, in which said oxide of at least one luminescent rare earth is a rare-earth oxide doped with a doping element.

10. The composition of claim 9, wherein the doping element is selected from rare earths different from the rare earth of the oxide.

11. The composition according to claim 1, in which said oxide is gadolinium oxide doped with terbium, gadolinium oxide doped with europium, ytterbium oxide doped with europium, or vanadium oxide doped with europium.

12. The composition according to claim 1, in which a concentration of the oxide in the dispersion is from 0.01% to 10% by weight.

13. The composition according to claim 1, in which the non-ionic surfactant is selected from surfactants composed of at least one alkyl phenol group and at least one ethylene oxide group.

14. The composition according to claim 1, in which a concentration of the surfactant is from 0.001 to 10% by weight.

15. A varnish comprising:
   the composition according to claim 1;
   at least one hydrophobic organic solvent; and
   at least one polymer.

16. The varnish according to claim 15, in which a concentration of the particles is between 0.01% and 1% by weight.

17. The varnish according to claim 15, in which the polymer is a film forming polymer.

18. The varnish according to claim 15, in which the polymer is selected from polyvinyl chlorides, aminoplasts, polyurethanes, unsaturated polyesters, phenoplasts, polysiloxanes, epoxy resins, allyl resins, vinyl esters, alkyds, polyureas, polyisocyanurates, poly(bismaleimide)s and polybenzimidazoles.

19. A substrate with a mark or marking obtained by at least one drying and absorption of the varnish according to claim 15.

20. The substrate according to claim 19, wherein the substrate is made from metal, glass, ceramic, a material containing cellulose, synthetic polymer, plexiglas, fabric, or composite of a plurality of the preceding materials.

21. The composition of claim 1, in which said surfactant has an HLB from 4 to 10.

22. A method comprising the following steps carried out in succession:
   adding particles of at least one oxide of at least one luminescent rare earth to a hydrophobic medium to form thereby a dispersion A;
   adding a non-ionic surfactant to dispersion A; and
   subjecting dispersion A containing the non-ionic surfactant to at least one mechanical action.

23. The method according to claim 13, in which the mechanical action is a shear action, an ultrasonic action, a grinding action, or a combination of two or more of these actions.

24. The method of claim 22, further comprising, preparing a varnish by, after the subjecting, mixing a solution of at least one polymer in at least one hydrophobic solvent with the dispersion A containing the non-ionic surfactant, and the mixture of the solution of at least one polymer in at least one hydrophobic solvent and of the dispersion A containing the non-ionic surfactant is subjected to at least one mechanical action.

25. The method according to claim 24, in which the hydrophobic organic solvent is the same as the hydrophobic medium.

26. The method according to claim 24, further comprising:
   marking substrates by coating these substrates with the varnish.

27. The method of claim 24, further comprising:
   placing markings on objects using the varnish, said markings being invisible to the naked eye and visible only when illuminated by ultraviolet radiation;
   subjecting the objects to excitation by ultraviolet radiation;
   reading said markings by detecting luminescence radiation emitted by these markings; and
   identifying said objects according to said reading.

* * * * *